No. 11,919. Reissued July 2, 1901.

J. LUPPINO.

ADJUSTABLE SUPPORT FOR CHAIR BACKS.

(Application filed Apr. 15, 1901.)

Witnesses:

H. M. Rugg.

Florence E. Cook.

Inventor:

Joseph Luppino.

By Rufus B. Fowler

Attorney

THE NORRIS PETERS CO., WASHINGTON, D. C.

UNITED STATES PATENT OFFICE.

JOSEPH LUPPINO, OF NEW HAVEN, CONNECTICUT.

ADJUSTABLE SUPPORT FOR CHAIR-BACKS.

SPECIFICATION forming part of Reissued Letters Patent No. 11,919, dated July 2, 1901.

Original No. 668,381, dated February 19, 1901. Application for reissue filed April 15, 1901. Serial No. 56,004.

*To all whom it may concern:*

Be it known that I, JOSEPH LUPPINO, a subject of the King of Italy, and a resident of New Haven, in the county of New Haven and State of Connecticut, have invented a new Improvement in Adjustable Supports for Chair-Backs; and I do hereby declare the following, when taken in connection with the accompanying drawings and the letters of reference marked thereon, to be a full, clear, and exact description of the same, and said drawings constitute part of this specification, and represent, in—

Figure 1:
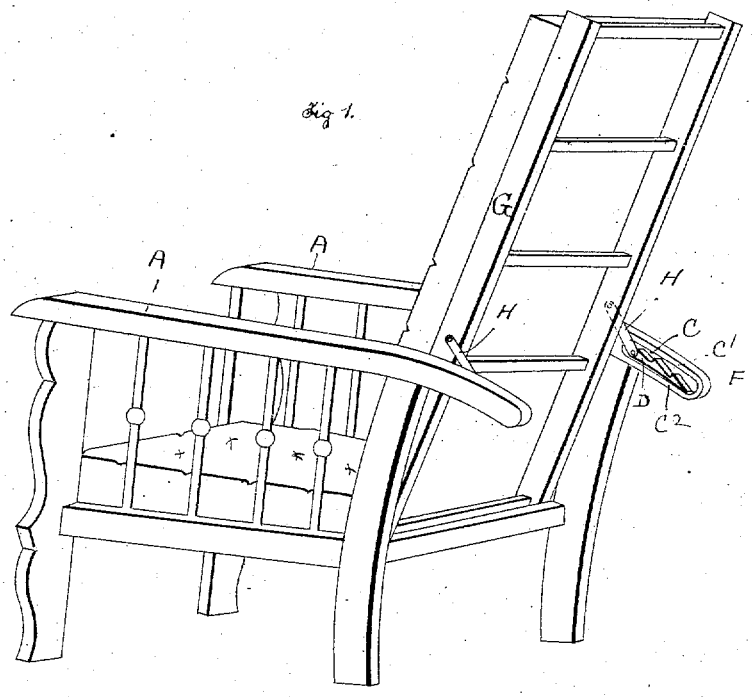
Figure 2:
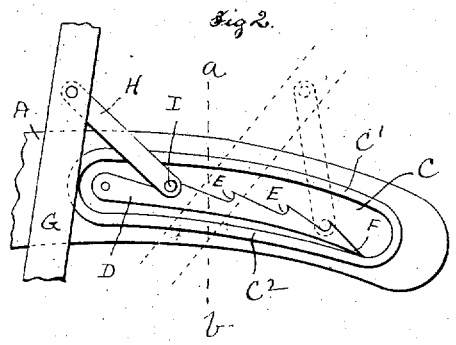
Figure 3:
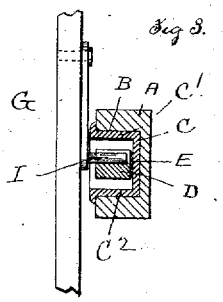

Figure 1, a perspective view of a chair having an adjusting device constructed in accordance with my invention; Fig. 2, a broken side view of one side of the back-supports enlarged and Fig. 3, a sectional view on the line *a b* of Fig. 2.

This invention relates to an improvement in an adjustable support for chair-backs, particularly that class which are commonly known as "Morris chairs," and while the invention is particularly applicable and will be shown and described as a support for chair-backs it will be evident that it is equally applicable to the support of adjustable ends for couches, beds, &c.

The object of this invention is to produce a simple device by which the back may be adjusted to various angles and avoid the use of rods which are now commonly employed in Morris chairs; and the invention consists in the employment of a bar pivoted at its forward end a short distance above a fixed track or flange, with its free end pointed and normally resting against said fixed track or flange and having on its upper side a series of ratchet-shaped teeth with which a pin or arm secured to the back of a chair may engage and from which the pin or arm may be disengaged by simply moving the back in the proper direction, as will be more fully hereinafter described, and particularly recited in the claims.

In illustrating my invention I have shown in Fig. 1 of the drawings a Morris chair of usual construction, except that the arms A A, which extend rearward, are each formed with a recess B, into which a socket C is placed, the socket corresponding in curvature to the curvature of the rear ends of the arms and having an upper wall or flange C′ and a lower wall or flange $C^2$. Within this socket or chamber a tongue D is pivoted at its forward end, the said tongue being shorter than the length of the chamber and provided on its upper side with ratchet-shaped teeth or notches E and having its rear end F pointed. This tongue or rack D is pivoted between the upper and lower flanges C′ $C^2$ near the forward end of the chamber, so as to leave a space above and below it, and it is shorter than the length of the chamber, so as to fall short of the outer end thereof. To each side of the back G of the chair an arm H is pivoted. The said arm is provided at its outer end with a finger I, which extends into the chamber C and is adapted to engage with the several notches E on the tongue or rack D. To adjust the angle of the back from the position shown in broken lines, Fig. 2, to the position shown in full lines in that figure, the back is simply raised, which causes the finger I to ride over the upper side of the tongue or rack and engage with the notches therein. If, however, it is desired to let the back fall rearward, it is first raised, so that the finger I passes over and around the forward end of the tongue, when it will be free to fall by gravity beneath the said tongue, which is permitted to rise to allow the finger to escape beneath its rear end. As the back is lowered the finger I slides along the lower flange $C^2$, which serves as a supporting-track for the finger until it has passed beyond the free end of the tongue D. This tongue or rack will then fall by gravity in front of the finger, so that when the back is again raised the finger will be lifted by the pointed end F and will rise over the upper surface of the tongue or rack and engage with either of the several notches therein. The flange $C^2$ and the tongue D therefore constitute two tracks on which the finger I is supported as the chair-back is raised and lowered, the former supporting the finger when the chair-back is lowered and also serving as a stop for the free end of the tongue D, which is lifted as the finger moves over the track or flange $C^2$. When the finger I has reached its lowest position, the free end of the tongue falls by gravity in front of the finger and its pointed end F acts as a switch when the chair-back is raised to lift the finger and direct it over the upper and notched side of the tongue.

Instead of securing the arms H to the back G and forming those arms with fingers I it is evident that the fingers or other devices may be otherwise engaged with the back or device to be supported and so as to engage with the tongue D. I therefore do not wish to be understood as limiting the invention to the exact construction shown. I am aware, however, that the supports for couches or mattresses have been so formed that they may be, as might be said, "automatically" adjusted, and therefore I do not wish to be understood as claiming, broadly, devices for accomplishing this object; but, Having fully described my invention, what I claim as new, and desire to secure by Letters Patent, is—

1. The herein-described support comprising a chamber, a rack of less area than the area of the said chamber and pivotally mounted therein near one end so as to leave a space around it, substantially as described.

2. The herein-described support, comprising a chamber, a rack of less area than the area of the said chamber and pivotally mounted therein near one end and so as to leave a space around it, the outer end of said rack pointed and normally resting upon the bottom of the chamber, substantially as described.

3. The combination with a frame and a swinging back, of a chamber carried by one of these parts and a finger carried by the other part, said finger extending into said chamber, and a rack of less area than the area of the chamber and pivotally mounted therein near one end, and adapted to be engaged by the said finger whereby the finger may be held by the rack or allowed to pass beneath it, substantially as described.

4. The combination with a framework comprising a fixed and a hinged member, of a finger pivotally connected with said hinged member, and a support attached to said fixed member, said support consisting of a fixed track and a tongue pivoted at its forward end above the forward end of said fixed track with its free end normally resting against said fixed track, said pivoted tongue having a pointed free end and notches on its upper side, substantially as described.

5. The combination in an adjustable support, as described, of a flange $C^2$, a tongue D pivoted at its forward end above said flange and having notches E in its upper side and having a rear pointed end F normally resting against said flange, and a pivoted finger adapted to engage said notches, substantially as described.

Dated this 29th day of March, 1901.

JOSEPH LUPPINO.

Witnesses:

FREDERIC C. EARLE,

A. J. WADLEIGH.